(12) United States Patent
Scheiermann et al.

(10) Patent No.: US 12,308,046 B2
(45) Date of Patent: May 20, 2025

(54) INERTIAL SENSOR UNIT AND METHOD FOR DETECTING A SPEECH ACTIVITY

(71) Applicant: Robert Bosch GmbH, Stuttgart (DE)

(72) Inventors: Sergej Scheiermann, Reutlingen (DE); Omar Elrhoul, Reutlingen (DE); Rainer Dorsch, Kirchentellinsfurt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 30 days.

(21) Appl. No.: 17/340,404

(22) Filed: Jun. 7, 2021

(65) Prior Publication Data

US 2022/0005495 A1 Jan. 6, 2022

(30) Foreign Application Priority Data

Jul. 1, 2020 (DE) .......................... 102020208206.5

(51) Int. Cl.
*G10L 25/78* (2013.01)
(52) U.S. Cl.
CPC .................................... *G10L 25/78* (2013.01)
(58) Field of Classification Search
CPC .......... G10L 25/78; G01H 1/00; G01H 17/00; G01P 3/00; G01P 15/00; G01P 15/18
See application file for complete search history.

(56) References Cited

U.S. PATENT DOCUMENTS 10,397,687 B2 8/2019 Watts et al.
10,515,623 B1 * 12/2019 Grizzel ................... G06F 3/012
11,479,258 B1 * 10/2022 Sanchez ............ B60W 50/0097
2001/0044725 A1 * 11/2001 Matsuda ................. G10L 19/00
704/270.1
2009/0027229 A1 * 1/2009 Fortson .................... H04Q 9/00
340/870.07
2012/0026348 A1 * 2/2012 Yun ..................... H04N 23/6812
348/208.4
2013/0196715 A1 8/2013 Hansson et al.
2014/0020445 A1 * 1/2014 Waters ................... G01C 23/00
73/1.01
2014/0093091 A1 4/2014 Dusan et al.
2014/0215246 A1 * 7/2014 Lee ........................ G04G 19/12
713/323

(Continued)

*Primary Examiner* — Daniel C Washburn
*Assistant Examiner* — Athar N Pasha
(74) *Attorney, Agent, or Firm* — NORTON ROSE FULBRIGHT US LLP

(57) ABSTRACT

An inertial sensor unit, including a sensor element for detecting and converting movements and vibrations into an electrical sensor signal, a signal processing element for evaluating the sensor signal, and an interface for signaling a detected speech activity. The signal processing element includes a first processing stage which checks a first criterion for the presence of a speech activity, and a second processing stage which checks a second criterion for the presence of a speech activity, the second processing stage being passed through only if the sensor signal has passed through the first processing stage and the first criterion for the presence of a speech activity has been met. The signal processing element is designed to activate the interface for signaling a speech activity only if the sensor signal has passed through the second processing stage, and the second criterion for the presence of a speech activity has been met.

16 Claims, 6 Drawing Sheets

(56) References Cited

U.S. PATENT DOCUMENTS

| | | | |
|---|---|---|---|
| 2015/0181629 A1* | 6/2015 | Jun | A61B 6/468 |
| | | | 455/420 |
| 2015/0205520 A1* | 7/2015 | Yim | G06F 3/04886 |
| | | | 715/268 |
| 2017/0263267 A1 | 9/2017 | Dusan et al. | |
| 2017/0365249 A1 | 12/2017 | Dusan et al. | |
| 2018/0059770 A1* | 3/2018 | Kingma | G06F 1/3215 |
| 2018/0324518 A1* | 11/2018 | Dusan | H04R 1/1091 |
| 2019/0291011 A1* | 9/2019 | Benedetto | G10L 15/26 |
| 2020/0314565 A1* | 10/2020 | Sigwanz | H04R 25/40 |
| 2020/0342878 A1* | 10/2020 | Lee | G10L 17/00 |
| 2020/0380958 A1* | 12/2020 | Srinivasan | G06F 16/65 |
| 2021/0125609 A1* | 4/2021 | Dusan | G10L 25/21 |
| 2022/0268654 A1* | 8/2022 | Krywyj | G01L 9/04 |

\* cited by examiner

INERTIAL SENSOR UNIT AND METHOD FOR DETECTING A SPEECH ACTIVITY

CROSS REFERENCE

The present application claims the benefit under 35 U.S.C. § 119 of German Patent Application No. DE 102020208206.5 filed on Jul. 1, 2020, which is expressly incorporated herein by reference in its entirety.

FIELD

The present invention relates to an inertial sensor unit and a method for detecting a speech activity with the aid of an inertial sensor unit. In particular, the present invention relates to an inertial sensor unit for a head-mounted device.

BACKGROUND INFORMATION

Acceleration sensors (accelerometers) may be used in the recognition of speech activity to improve the quality of the speech recognition. The signals of the acceleration sensors may be used, for example, to improve the signal-to-noise ratio or to carry out an automatic gain control.

A system and a method for carrying out an automatic gain control are described in U.S. Patent Application Publication No. US 2017/263267 A1, which uses an acceleration sensor in a headset. A speech signal is detected by evaluating the acceleration signals of the acceleration sensor. A signal preprocessing takes place in a first step with the aid of—and low-pass filters. In a second step, the evaluation of the acceleration signal takes place by a threshold comparison of the absolute amplitude or extracted envelope. The speech recognition may take place by a threshold comparison of the correlation of the acceleration signals with respect to two axes over a short time window.

U.S. Patent Application Publication No. US 2013/196715 A1 relates to an adapted noise suppression for a speech activity recognition.

A signal processing device is described in U.S. Pat. No. US 10,397,687 B2 for earphone speech recognition. Speech characteristics are ascertained based on signals of acceleration sensors. A microphone signal is activated, based on the ascertained speech characteristics, for example by using Kalman filters, by estimating the signal-to-noise ratio and the like.

U.S. Patent Application Publication No. US 2014/093091 A1 relates to a system for recognizing the speech activity of a user, using an acceleration sensor. The signals of acceleration sensors as well as the signals of microphones are taken into account in the speech activity recognition.

U.S. Patent Application Publication No. US 2017/365249 A1 relates to a system for carrying out automatic speech recognition using end point markings, which are generated with the aid of a speech activity detector based on an acceleration sensor. The speech activity recognition takes place on the basis of signals of acceleration sensors as well as signals of microphones.

In battery-operated or rechargeable battery-operated devices, such as earphones, microphone-based systems which detect audio data continuously for key word recognition or speech recognition require a great deal of energy, which is needed for data detection and speech processing purposes. The speech recognition algorithms normally run on external digital signal processors (DSP), which combine signals of microphones and acceleration sensors.

In addition, speech activity recognition based on microphones is susceptible to erroneous speech recognition, due to the existing background noises, in particular in loud surroundings.

SUMMARY

The present invention relates to an inertial sensor unit and a method for detecting a speech activity with the aid of an inertial sensor unit.

Preferred specific embodiments of the present application are described herein.

According to a first aspect, the present invention relates to an inertial sensor unit. In accordance with an example embodiment of the present invention, the inertial sensor unit includes a sensor element for detecting and converting movements and vibrations into an electrical sensor signal. The inertial sensor unit further includes signal processing element for evaluating the sensor signals, in particular with the goal of detecting vibrations induced by a speech activity. The inertial sensor unit further includes an interface for signaling a detected speech activity. The signal processing element include a first processing stage and a second processing stage for the sensor signal, the first processing stage being designed to check a first criterion for the presence of a speech activity, and the second processing stage being designed to check at least one further, second criterion for the presence of the speech activity. The second processing stage is passed through only if the sensor signal has passed through the first processing stage and the first criterion for the presence of a speech activity has been met. The signal processing element is designed to activate the interface for signaling a speech activity only if the sensor signal has passed through the second processing stage and the at least one further, second criterion for the presence of a speech activity has been met.

According to a second aspect, the present invention relates to a method for detecting a speech activity with the aid of an inertial sensor unit, which includes at least one sensor element, signal processing element and an interface for signaling a detected speech activity. In accordance with an example embodiment of the present invention, movements and vibrations are detected by the at least one sensor element and converted into at least one electrical sensor signal. The sensor signal is evaluated with the aid of the signal processing element. A first criterion for the presence of a speech activity is checked. At least one further, second criterion for the presence of a speech activity is checked only if the first criterion for the presence of a speech activity has been met. The interface is activated to signal a speech activity only if the at least one further, second criterion for the presence of a speech activity has been met.

Example embodiments of the present invention provide a particularly power-saving inertial sensor unit. The evaluation of the sensor signals generated by the sensor element takes place in two stages. In the first step, an evaluation takes place with the aid of the first processing stage, based on the instantaneous measured data. This is a simple evaluation, for example by the threshold comparison of the instantaneous measuring point. A more complex evaluation method is applied by the second processing stage only if the first criterion for the presence of a speech activity has been met. For example, stored values from a buffer may be taken into account.

According to an example embodiment of the present invention, at least two evaluation methods are therefore used in a time-variable manner. The first evaluation method may be based on the instantaneous data point and the second one on multiple data points in the buffer. The storage and the evaluation of the data in the buffer take place only after the first criterion of the first evaluation method has been met.

According to a further specific embodiment of the inertial sensor unit of the present invention, at least two sensor elements are provided for detecting movements and vibrations in different spatial directions. In particular, the inertial sensor unit may include sensor elements which detect accelerations or rotations along or around different axes.

According to a further specific embodiment of the inertial sensor unit of the present invention, at least one acceleration sensor element (accelerometer) and/or at least one rotation rate sensor element is/are provided. The inertial sensor unit may include 2-axis or 3-axis accelerometers and/or rotation rate sensors.

According to a further specific embodiment of the inertial sensor unit of the present invention, the signal processing element also include at least one signal filter for preprocessing the sensor signal, in particular a high-pass filter and/or a bandpass filter, and at least one analog/digital converter for the sensor signal. The signal filter may include variable filter parameters. The analog/digital converter may have a variable sampling rate. The signal filter may be designed to suppress or filter acceleration signals which are not induced by the speech activity but by the movement of a user.

According to a further specific embodiment of the inertial sensor unit of the present invention, different operating modes may be implemented, in that individual components of the inertial sensor unit may be optionally activated or deactivated and/or operated in different operating modes. For example, sensor components may be activated or deactivated axis by axis, or the second processing stage may be activated or deactivated. For example, the analog/digital converter may be additionally or alternatively operated in different operating modes. In the first operating mode, the inertia sensor unit is thus operated in a particularly power-saving manner. According to one specific embodiment of the inertial sensor unit, this may be achieved by a low data rate, a low oversampling rate (OSR) or by the measurement, using only a single axis. Once the first criterion has been met, the inertial sensor unit may automatically transition to the second operating mode. Only then does the inertial sensor unit store measured data in a buffer and, once a predefined number of the measured data points have been stored, a more complex evaluation of the buffer contents takes place. If the second criterion is met, a signal is generated via the speech recognition.

A power-saving implementation is ensured in that the inertial sensor unit automatically switches between two operating modes, and a variable, power-saving evaluation is thus made possible, which requires few computation operations, but may be achieved by deactivating individual axes or by configuring the oversampling rate.

According to a further specific embodiment of the inertial sensor unit of the present invention, in a first operating mode, the first processing stage of the signal processing element is operated in the first operating mode and the second processing stage is deactivated. In a second operating mode, the first processing stage of the signal processing element is operated in the second operating mode and the second processing stage is activated. The signal processing element is designed to automatically switch between the first operating mode and the second operating mode, depending on whether the first and/or the second criterion for the presence of a speech activity has/have been met.

According to a further specific embodiment of the inertial sensor unit of the present invention, the current consumption is lower in the first operating mode than in the second operating mode. In the first operating mode, at least one parameter may be configured or optimized as follows:

The data rate is selected to be low, compared to the second operating mode, for example 2 kHz.

Compared to the second operating mode, a higher noise level and a lower oversampling rate are set.

Only one active axis of the sensor element is used for the evaluation. For this purpose, only one channel in the analog/digital converter may be activated, or only one analog/digital converter may be activated.

In the second operating mode, at least one parameter may be configured or optimized as follows:

The data rate is selected to be higher, compared to the first operating mode, for example 4 kHz or 8 kHz.

The data are stored in an activated first-in-first-out memory (FIFO).

Multiple axes of the sensor element are activated. For example, two axes may be activated, for example X and Z, or three axes may be activated, i.e., X, Y and Z.

Compared to the first operating mode, a lower noise level and a higher oversampling rate are set. The conversion rate may be increased, compared to the first operating mode.

According to a further specific embodiment of the inertial sensor unit of the present invention, the first processing stage includes at least one comparator, which compares the instantaneous signal amplitude of the sensor signal with at least one threshold value to determine whether the first criterion for the presence of a speech activity has been met. The speech activity may be differentiated thereby from other movements of the user.

According to a further specific embodiment of the inertial sensor unit of the present invention, the second processing stage of the signal processing element includes a buffer for buffering a defined number of consecutive sampling values of the sensor signal and signal analysis element for ascertaining at least one signal property, based on the buffered sampling values, and for comparing this at least one signal property with the at least one further second criterion for the presence of a speech activity. This makes it possible to determine, in a power-saving manner, whether a speech activity is in fact present.

According to a further specific embodiment of the inertial sensor unit of the present invention, the signal analysis element is designed to compare at least one ascertained signal property with at least one further, third criterion for the purpose of recognizing at least one further cause for the sensor signal. Further causes may be ruled out thereby, for example shocks, tapping on the device by users or scratching motions.

According to a further specific embodiment of the inertial sensor unit of the present invention, the speech activity may be signaled to an external system. This may take place, for example, with the aid of an interrupt method. For example, a digital signal processor (DSP) may be woken up. The inertial sensor unit may wake up the overall system in order to reduce the necessary data traffic between the DSP and a host CPU, in that, for example, the DSP is in a sleep mode by default. The current consumption may be reduced by integrating the detection of the speech activity into the inertial sensor unit. The overall system must furthermore be woken up only if a speech activity is detected.

According to a further specific embodiment of the method for detecting a speech activity of the present invention, the sensor signal is preprocessed with the aid of the signal processing element, and the preprocessing of the sensor signal includes a signal filtering, in particular a high-pass filtering and/or a bandpass filtering, and an analog/digital conversion, in which the analog sensor signal is sampled and digitized, so that the digitized sensor signal is present in the form of a sequence of sampling values.

According to a further specific embodiment of the method for detecting a speech activity of the present invention, the first criterion for the presence of a speech activity is checked in that the instantaneous signal amplitude or the instantaneous sampling value of the sensor signal is compared with at least one threshold value.

According to a further specific embodiment of the method for detecting a speech activity of the present invention, a check of whether the instantaneous signal amplitude or the instantaneous sampling value of the sensor signal is greater than a first threshold value and/or less than a second threshold value is carried out as the first criterion for the presence of a speech activity.

According to a further specific embodiment for the method for detecting a speech activity of the present invention, if the first criterion for the presence of a speech activity is met, a predefined number N of consecutive sampling values of the sensor signal are buffered in a buffer of the signal processing element, at least one signal property is ascertained, based on the buffered sampling values, and the at least one signal property is compared with the at least one further, second criterion for the presence of a speech activity.

According to a further specific embodiment of the method for detecting a speech activity of the present invention, if the first criterion for the presence of a speech activity is met, at least one ascertained signal property is compared with at least one further, third criterion for the purpose of recognizing at least one further cause of the sensor signal.

According to a further specific embodiment of the method for detecting a speech activity of the present invention, the inertial sensor unit is operated in a first operating mode as long as only the first criterion for the presence of a speech activity is checked, the inertial sensor unit being operated in a second operating mode if the at least one further second criterion for the presence of a speech activity is checked and being automatically switched between the first operating mode and the second operating mode, depending on whether the first and/or the at least one further, second criterion for the presence of a speech activity has been met.

According to a further specific embodiment of the method for detecting a speech activity, the different operating modes of the inertial sensor unit are implemented in that individual components of the inertial sensor unit are optionally activated and deactivated and/or operated in different operating modes.

DETAILED DESCRIPTION OF EXAMPLE EMBODIMENTS

Figure 1:
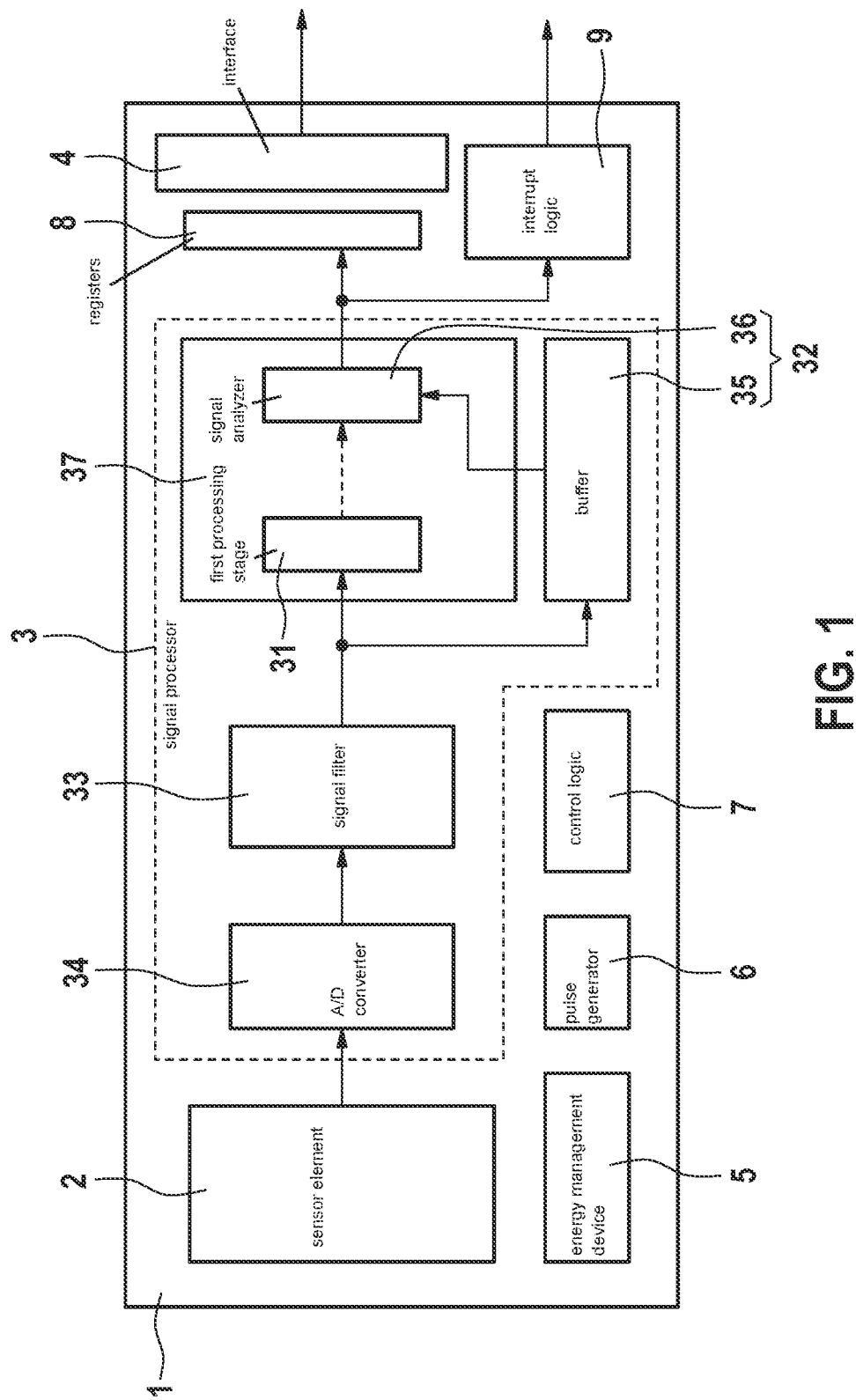
FIG. 1 shows a schematic block diagram of an inertial sensor unit according to one specific example embodiment of the present invention.

FIG. 1 shows a schematic block diagram of an inertial sensor unit 1, which may be used, for example, in a portable device, in particular an earphone, a headphone, a helmet or a pair of smart glasses.

Inertial sensor unit 1 includes a device 5 for energy management, a pulse generator 6 and a control logic 7. Inertial sensor unit 1 further includes an interface 4 for signaling a detected speech activity. Inertial sensor unit 1 further includes at least one sensor element 2 for detecting and converting movements and vibrations into an electrical sensor signal. For example, acceleration sensor elements 2 may be provided for measuring accelerations along axes X, Y and Z, which are perpendicular to each other. Rotation rate sensor elements may also be provided for measuring rotations around axes X', Y', and Z', which are perpendicular to each other, the axes for measuring the accelerations and for measuring the rotations being able to be identical. Movements and vibrations may thus be preferably detected in different spatial directions.

Inertial sensor unit 1 further includes signal processing element 3 for evaluating the sensor signal, in particular for the purpose of detecting vibrations induced by a speech activity. Signal processing element 3 includes an analog/digital converter 34, which digitizes the sensor signals of the at least one sensor element 2. Analog/digital converter 34 may have a variable sampling rate. The signals output by analog/digital converter 34 are preprocessed by a signal filter 33. Signal filter 33 may include variable filter parameters. Signal filter 33 may include a high-pass filter and/or a bandpass filter.

Signal processing element 3 includes a first processing stage 31 and a second processing stage 32 for the sensor signal. First processing stage 31 checks a first criterion for the presence of a speech activity. Second processing stage 32 checks a further, second criterion for the presence of a speech activity. Second processing stage 32 is passed through only if the sensor signal has passed through first processing stage 31 and the first criterion for the presence of a speech activity has been met. First processing stage 31 may establish, with the aid of a comparator, whether the instantaneous signal amplitude of the sensor signal exceeds a threshold value. If this is the case, the first criterion for the presence of a speech activity is met.

Signal processing element 3 is designed to activate interface 4 for signaling a speech activity only if the sensor signal has passed through second processing stage 32 and the at least one further, second criterion for the presence of a speech activity has been met.

Second processing stage 32 of signal processing element 3 includes a buffer 35 for buffering a defined number of consecutive sampling values of the sensor signal and signal analysis element 36 for ascertaining at least one signal property, based on the buffered sampling values, and for comparing this at least one signal property with the at least one further second criterion for the presence of a speech activity. Signal analysis element 36 may further compare an ascertained signal property with at least one further, third criterion for the purpose of recognizing a further cause of the sensor signal. Further causes may be ruled out thereby, for example shocks or scratching motions. Signal analysis element 36 and first processing stage 31 are part of a speech activity recognition unit 37. The latter may store the status of the speech activity (detected/not detected) in registers 8 or output it via an interrupt logic 9.

Figure 2:
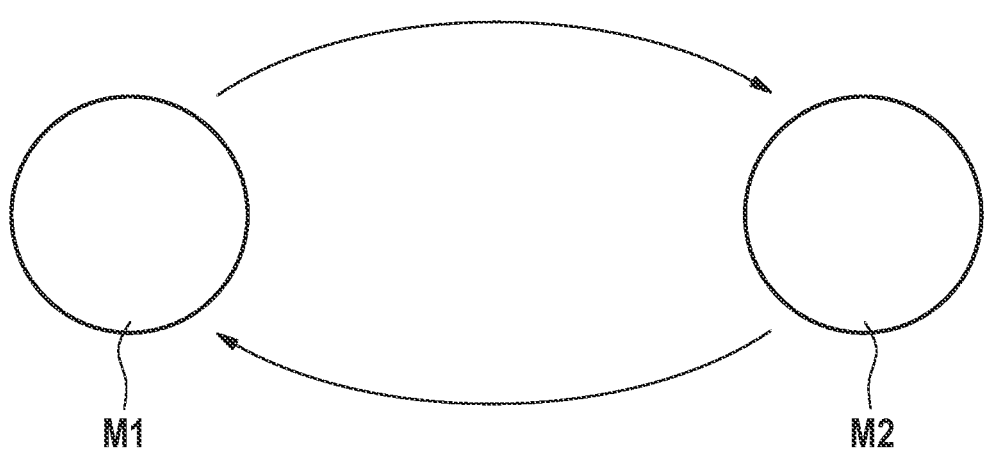
FIG. 2 shows a schematic representation of two operating modes in accordance with an example embodiment of the present invention.

FIG. 2 shows a schematic representation of two operating modes M1, M2, in which inertial sensor unit 1 may be operated. Individual components of inertial sensor unit 1 may be activated, deactivated or operated in different operating modes. For example, sensor elements 2 may be activated or deactivated axis by axis, or second processing stage 32 may be activated or deactivated. For example, analog/digital converter 34 may be additionally or alternatively operated in different operating modes M1, M2.

In first operating mode M1, first processing stage 31 of the signal processing element may be operated in first operating mode M1 and second processing stage 32 may be deactivated. In a second operating mode M2, first processing stage 31 of signal processing element 3 is operated in second operating mode M2 and second processing stage 32 is activated. Signal processing element 3 automatically switch between first operating mode M1 and second operating mode M2, depending on whether the first and/or the second criterion for the presence of a speech activity has/have been met.

In first operating mode M1, for example, the measurement may take place at low data rates, using a low oversampling rate of the signal, or the measurement may take place only with the aid of a single axis (the remaining A/D converter channels are deactivated). Second operating mode M2 is designed to carry out the detection of the data as accurately and quickly as possible. For example, second operating mode M2 may be implemented by a higher data rate, by a higher oversampling rate and/or by measuring all axes (two or three).

Figure 3:
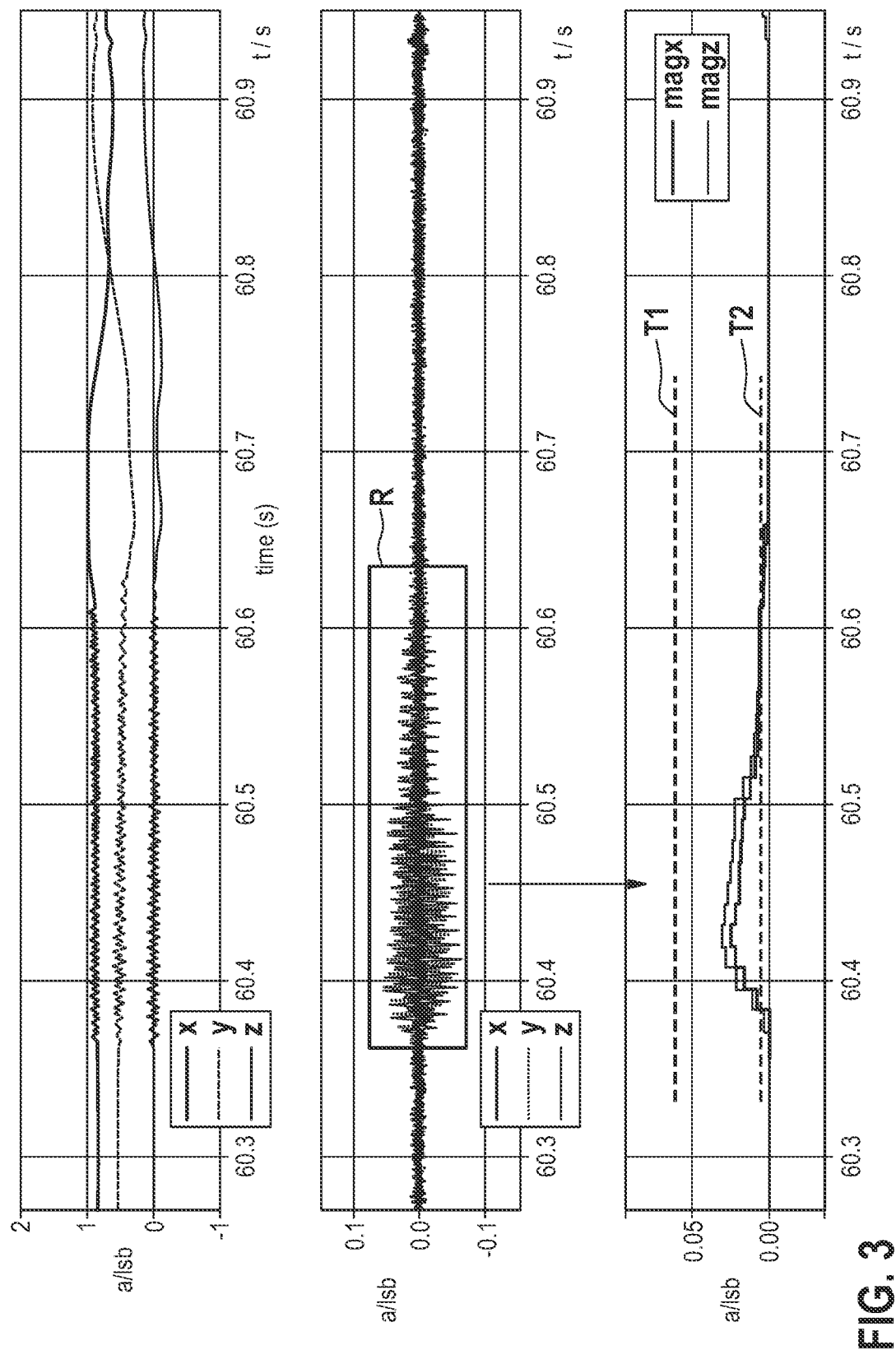
FIG. 3 shows a schematic illustration of acceleration signals, which are detected by an inertial sensor unit according to one specific example embodiment of the present invention.

FIG. 3 shows a schematic illustration of acceleration signals, which are detected by inertial sensor unit 1. At the top of FIG. 3, acceleration a measured by sensor element 2 is illustrated in the unit LSB (least significant bit) for times t (in seconds s) within a certain period of time and for three different axes x, y, z. The corresponding data after passing through high-pass filter 33 is illustrated in the middle of FIG. 3. A frame R shows the area in which speech signals occur. Mean amplitudes magx, magz for the x and z directions are illustrated at the bottom of FIG. 3, a first threshold value T1 and a second threshold value T2 being plotted. A criterion for the presence of a speech activity may be met if mean amplitudes magx, magz are between first threshold value T1 and second threshold value T2.

Figure 4:
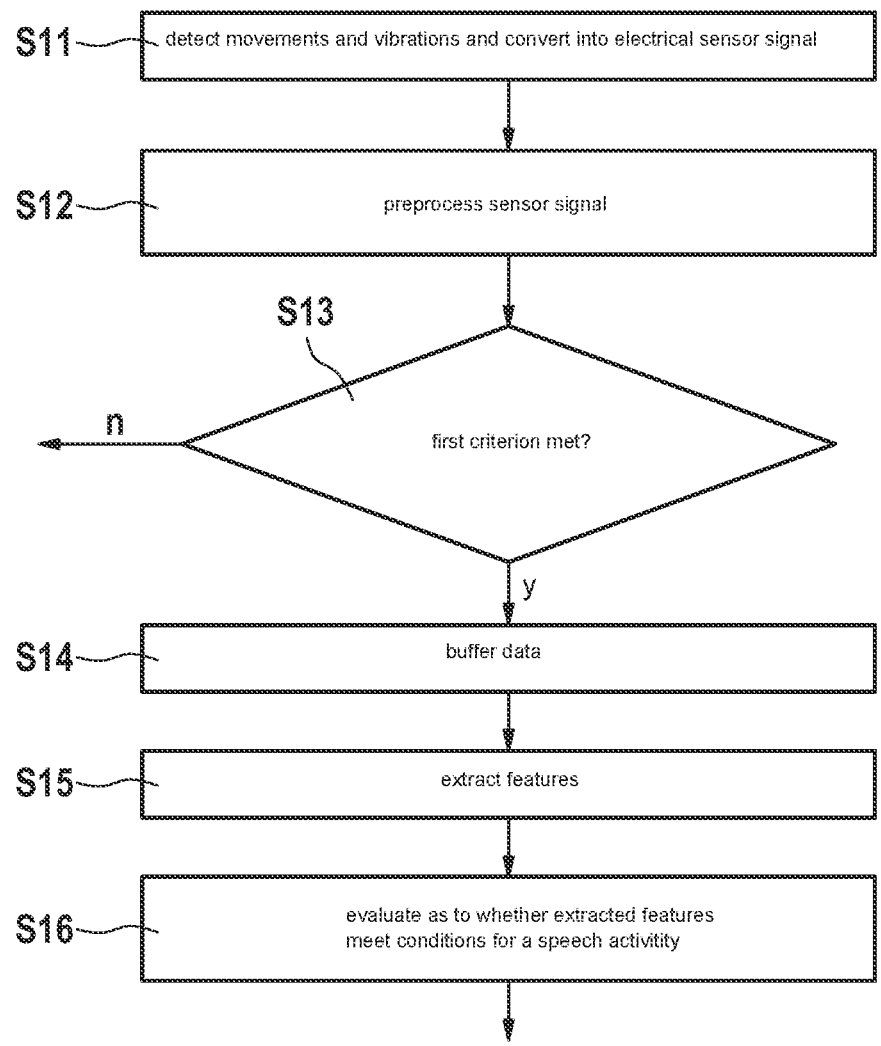
FIG. 4 shows a flowchart of a method for detecting a speech activity with the aid of an inertial sensor unit according to one specific example embodiment of the present invention.

FIG. 4 shows a flowchart of a method for detecting a speech activity with the aid of an inertial sensor unit in particular with the aid of an inertial sensor unit 1 described above. Conversely, inertial sensor unit 1 may also be designed to carry out one of the methods described below. Inertial sensor unit 1 includes a sensor element 2, signal processing element 3 and an interface 4 for signaling a detected speech activity.

In a first method step S11, movements and vibrations are detected by sensor element 2 and converted into an electrical sensor signal. In a second method step S12, a preprocessing of the sensor signal takes place, for example with the aid of a high-pass and/or low-pass filter, for the purpose of removing the signal portions which correspond to typical movements of the user. For example, a bandpass filter may be used, which allows a frequency range between 250 Hz and 2 kHz to pass through.

In a method step S13, a check is carried out as to whether a first criterion is met. This is a condition for checking whether the signal is a speech signal. In particular, it is possible to check whether an absolute value of the preprocessed sensor signal is between a first threshold value and a second threshold value. If this is not the case, the method is aborted or repeated.

Otherwise, in a method step S14, data are buffered in a buffer 35, which has a size N, including a whole number N.

In a method step S15, features are extracted from the data stored in buffer 35. For example, a mean amplitude, a zero crossing rate and the like may be extracted.

In a further method step S16, an evaluation, based on a second criterion, is made as to whether the extracted features meet the conditions for a speech activity. A speech activity is possibly detected. Interface 4 is activated for the purpose of signaling a speech activity.

Figure 5:
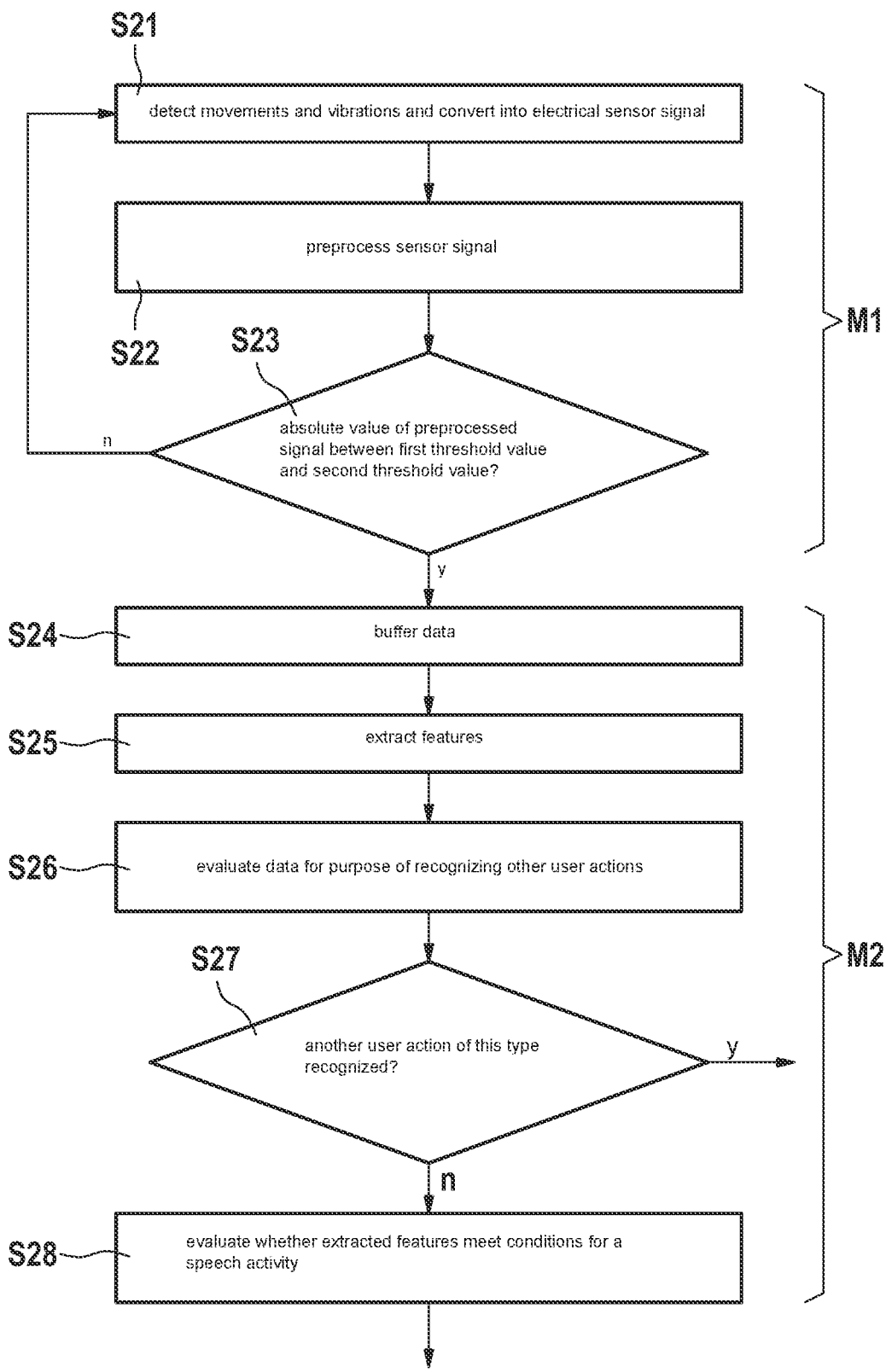
FIG. 5 shows a flowchart of a method for detecting a speech activity with the aid of an inertial sensor unit according to a further specific example embodiment of the present invention.

FIG. 5 shows a flowchart of a method for detecting a speech activity with the aid of an inertial sensor unit in particular with the aid of an inertial sensor unit 1 described above. Inertial sensor unit 1 includes a sensor element 2, signal processing element 3 and an interface 4 for signaling a detected speech activity.

In a first method step S21, movements and vibrations are again detected by sensor element 2 and converted into an electrical sensor signal. In a second method step S22, a preprocessing of the sensor signal takes place as described above.

In a method step S23, a check is carried out, as described above, as to whether an absolute value of the preprocessed sensor signal is between a first threshold value and a second threshold value. If this is not the case, the method is aborted or repeated.

Otherwise, data are buffered in a buffer 35 in a method step S24.

In a method step S25, features are extracted from the data stored in buffer 35, as described above.

In a method step S26, the data are evaluated for the purpose of recognizing other user actions. For example, shocks, tapping, touching or operating the device by the user may be recognized. This may be recognized if one or multiple data points in buffer 35 has/have values above a maximum threshold value. Methods may be used to recognize the other user actions, such as Fourier analysis, spectral analysis or wavelet analysis.

In a method step S27, an evaluation takes place as to whether another user action of this type was recognized. If this is the case, the activity is not a speech activity, and the method is aborted or repeated.

Otherwise, in a method step S28, an evaluation takes place, based on a second criterion, as to whether the extracted features meet the conditions for a speech activity, as described above. A speech activity is possibly detected. Interface 4 is activated for the purpose of signaling a speech activity.

During method steps S21 through S23, inertial sensor unit 1 is operated in first operating mode M1. During method steps S24 through S28, inertial sensor unit 1 is operated in second operating mode M2.

Figure 6:
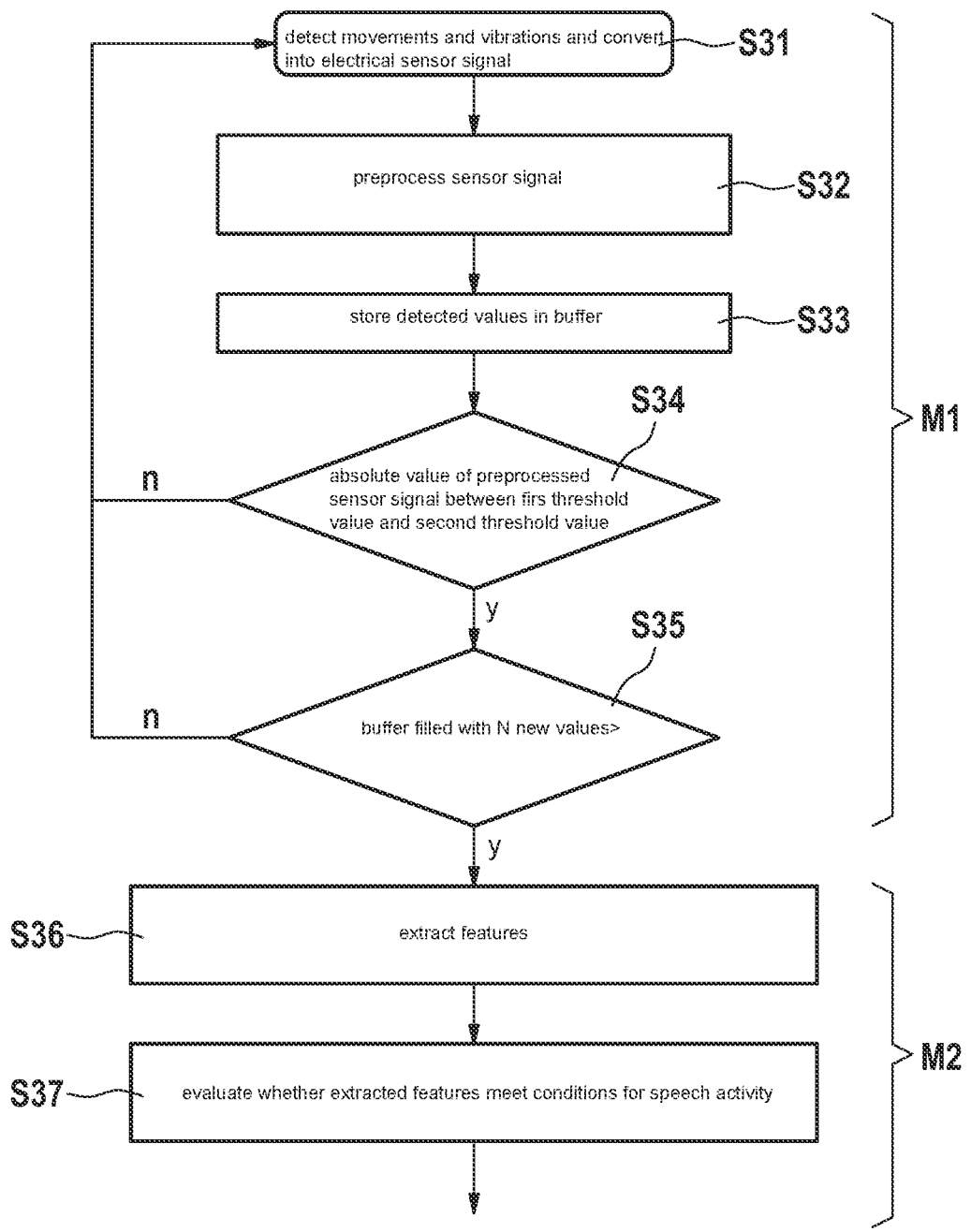
FIG. 6 shows a flowchart of a method for detecting a speech activity with the aid of an inertial sensor unit according to a further specific example embodiment of the present invention.

FIG. 6 shows a flowchart of a method for detecting a speech activity with the aid of an inertial sensor unit, in particular with the aid of an inertial sensor unit 1 described above. Inertial sensor unit 1 includes a sensor element 2, signal processing element 3 and an interface 4 for signaling a detected speech activity.

In a first method step S31, movements and vibrations are detected by sensor element 2 and converted into an electrical sensor signal, as described above. In a second method step S32, a preprocessing of the sensor signal takes place as described above.

In a method step S33, the sensor signal, i.e., the detected values, is stored in buffer 35.

In a method step S34, a check is carried out as to whether an absolute value of the preprocessed sensor signal is between a first threshold value and a second threshold value. If this is not the case, method step S31 is again carried out.

Otherwise, a check is carried out in method step S35 as to whether the buffer is filled with N new values. If this is not the case, method step S31 is again carried out.

In a method step S36, features are extracted from the data stored in buffer 35, as described above.

In a method step S37, an evaluation takes place, based on a second criterion, as to whether the extracted features meet the conditions for a speech activity, as described above. A speech activity is possibly detected. Interface 4 is activated for the purpose of signaling a speech activity.

Method steps S31 through S35 are thus always carried out M1, while method steps S36 through S37 are carried out only if evaluations S34, S35 were successful M2.

This method permits a variable evaluation of the stored data in buffer 35, the evaluation of buffer 35 taking place only after criterion 1 (simple threshold comparison) is met and a predefined number of the measured data is additionally stored after criterion 1 has been met.

According to this design, the measured data from buffer 35 are compiled for the evaluation in such a way that the measured data are contained in the evaluation window before and after the check of the criterion. A power-saving detection of a speech activity is made possible thereby. The detection is very precise, since the signals before the criterion are also taken into account, and this is done quickly, since the latency period is short.

What is claimed is:

1. An inertial sensor unit, comprising:
   a. a sensor element configured to detect and convert movements and vibrations into an electrical sensor signal;
   b. a signal processing element configured to evaluate the sensor signal with a goal of detecting vibrations induced by a speech activity; and
   c. an interface configured to signal a detected speech activity,
   wherein
      the signal processing element includes a first processing stage and a second processing stage for the sensor signal, the first processing stage being configured to check a first criterion for a presence of a speech activity, and the second processing stage configured to check at least one further, second criterion for the presence of a speech activity,
      the second processing stage is passed through only if the sensor signal has passed through the first processing stage and the first criterion for the presence of a speech activity has been met, and
      the signal processing element is configured to activate the interface for signaling a speech activity only if the sensor signal has passed through the second processing stage and the at least one further, second criterion for the presence of a speech activity has been met,
   wherein the inertial sensor unit is configured to operate in different operating modes, in that individual components of the inertial sensor unit may be optionally activated or deactivated and/or operated in different operating modes,
   wherein:
      in a first operating mode, the first processing stage of the signal processing element is operated in the first operating mode and the second processing stage is deactivated;
      in a second operating mode, the first processing stage of the signal processing element is operated in the second operating mode and the second processing stage is activated; and
      the signal processing element is configured to automatically switch between the first operating mode and the second operating mode, depending on whether the first and/or the second criterion for the presence of a speech activity have been met,
   wherein in the first operating mode:
      a measurement occurs at low data rates by a low oversampling rate of the signal, and
      the measurement occurs only via a single axis,
   wherein in the second operating mode:
      the measurement occurs at higher data rates by a higher oversampling rate of the signal, and
      the measurement occurs via all axes.

2. The inertial sensor unit as recited in claim 1, wherein the sensor element includes at least two sensor elements configured to detect movements and vibrations in different spatial directions relative to one another.

3. The inertial sensor unit as recited in claim 1, wherein the sensor includes at least one acceleration sensor element and/or at least one rotation rate sensor element.

4. The inertial sensor unit as recited in claim 1, wherein the signal processing element further includes:
   at least one signal filter configured to preprocessing the sensor signal, the at least one signal filter including a high-pass filter and/or a bandpass filter; and
   at least one analog/digital converter for the sensor signal.

5. The inertial sensor unit as recited in claim 1, wherein current consumption is less in the first operating mode than in the second operating mode.

6. The inertial sensor unit as recited in claim 1, wherein the first processing stage includes at least one comparator, which compares an instantaneous signal amplitude of the sensor signal with at least one threshold value to determine whether the first criterion for the presence of a speech activity has been met.

7. The inertial sensor unit as recited in claim 1, wherein the second processing stage of the signal processing element includes at least:
   a buffer configured to buffer a defined number of consecutive sampling values of the sensor signal; and
   a signal analysis element configured to ascertain at least one signal property, based on the buffered sampling values and to comparing the at least one signal property with the at least one further, second criterion for the presence of a speech activity.

8. The inertial sensor unit as recited in claim 7, wherein the signal analysis element is configured to compare at least one ascertained signal property with at least one further, third criterion for recognizing at least one further cause of the sensor signal.

9. A method for detecting a speech activity using an inertial sensor unit, the sensor unit including at least one sensor element, a signal processing element, and an interface configured to signal a detected speech activity, the method comprising the following steps:
- detecting movements and vibrations by the at least one sensor element, and converting the detected movements and vibrations into at least one electrical sensor signal; and
- evaluating the sensor signal using the signal processing element, the evaluating including:
  - checking the sensor signal using a first criterion for a presence of a speech activity;
  - checking the signal using at least one further, second criterion for the presence of a speech activity only if the first criterion for the presence of a speech activity has been met; and
  - activating the interface for signaling a speech activity only if the at least one further, second criterion for the presence of a speech activity has been met,
  - wherein in a first operating mode:
    - a measurement occurs at low data rates by a low oversampling rate of the signal, and
    - the measurement occurs only via a single axis,
  - wherein in a second operating mode:
    - the measurement occurs at higher data rates by a higher oversampling rate of the signal, and
    - the measurement occurs via all axes.

10. The method as recited in claim 9, further comprising preprocessing the sensor signal using the signal processing element, the preprocessing of the sensor signal includes at least:
- a signal filtering, including a high-pass filtering and/or a bandpass filtering; and
- an analog/digital conversion, in which the sensor signal is sampled and digitized, so that the digitized sensor signal is present in the form of a sequence of sampling values.

11. The method as recited in claim 9, in which the first criterion for the presence of a speech activity is checked in that an instantaneous signal amplitude of the sensor signal or an instantaneous sampling value of the sensor signal is compared with at least one threshold value.

12. The method as recited in claim 9, wherein, as the first criterion for the presence of a speech activity, it is checked whether an instantaneous signal amplitude of the sensor signal or an instantaneous sampling value of the sensor signal is greater than a first threshold value and/or less than a second threshold value for a predefined period of time.

13. The method as recited in claim 10, wherein, if the first criterion for the presence of a speech activity is met:
- a predefined number of consecutive sampling values of the sensor signal are buffered in a buffer of the signal processing element;
- at least one signal property is ascertained, based on the buffered sampling values; and
- the at least one signal property is compared with the at least one further second criterion for the presence of a speech activity.

14. The method as recited in claim 13, wherein, if the first criterion for the presence of a speech activity is met, at least one ascertained signal property is compared with at least one further, third criterion for recognizing at least one further cause of the sensor signal.

15. The method as recited in claim 9, wherein the inertial sensor unit is operated in the first operating mode as long as only the first criterion for the presence of a speech activity is checked, the inertial sensor unit is operated in the second operating mode if the at least one further, second criterion for the presence of a speech activity is checked and is automatically switched between the first operating mode and the second operating mode, depending on whether the first and/or the at least one further, second criterion for the presence of a speech activity has been met.

16. The method as recited in claim 15, wherein the different operating modes of the inertial sensor unit are implemented in that individual components of the inertial sensor unit are optionally activated or deactivated and/or operated in different operating modes.

* * * * *